May 21, 1968 G. W. MOEHR 3,383,935
POWER SELECTOR
Original Filed Feb. 1, 1965
3 Sheets-Sheet 1
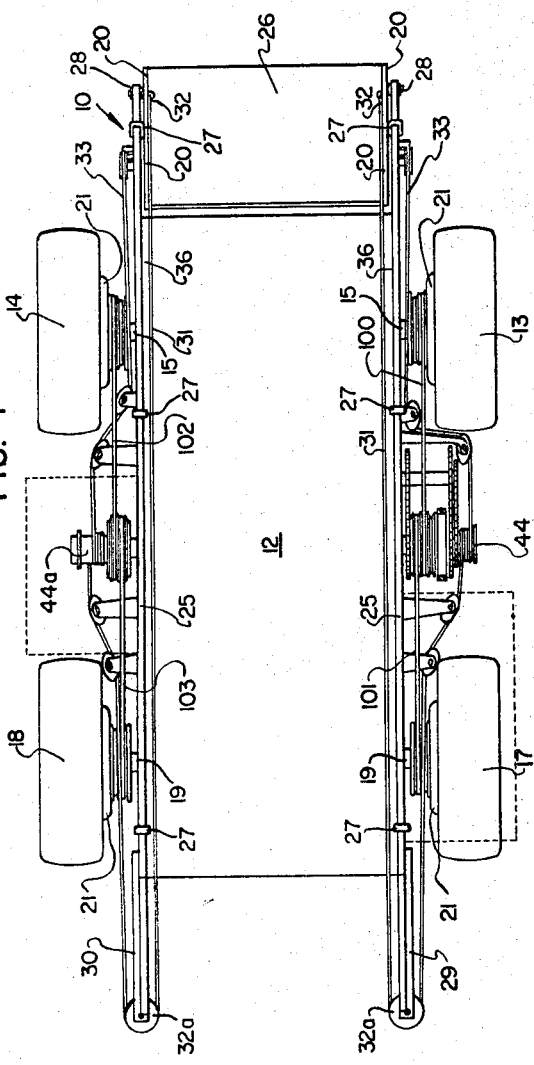
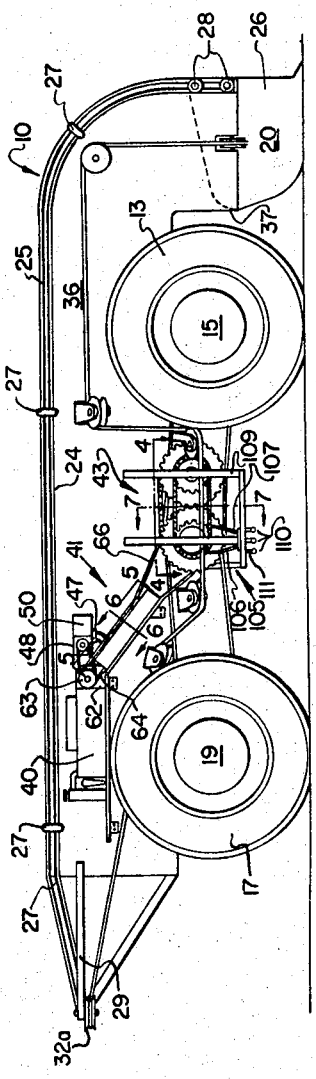
INVENTOR:
GEORGE W. MOEHR.
BY:
MALLINCKRODT & MALLINCKRODT
ATTORNEYS

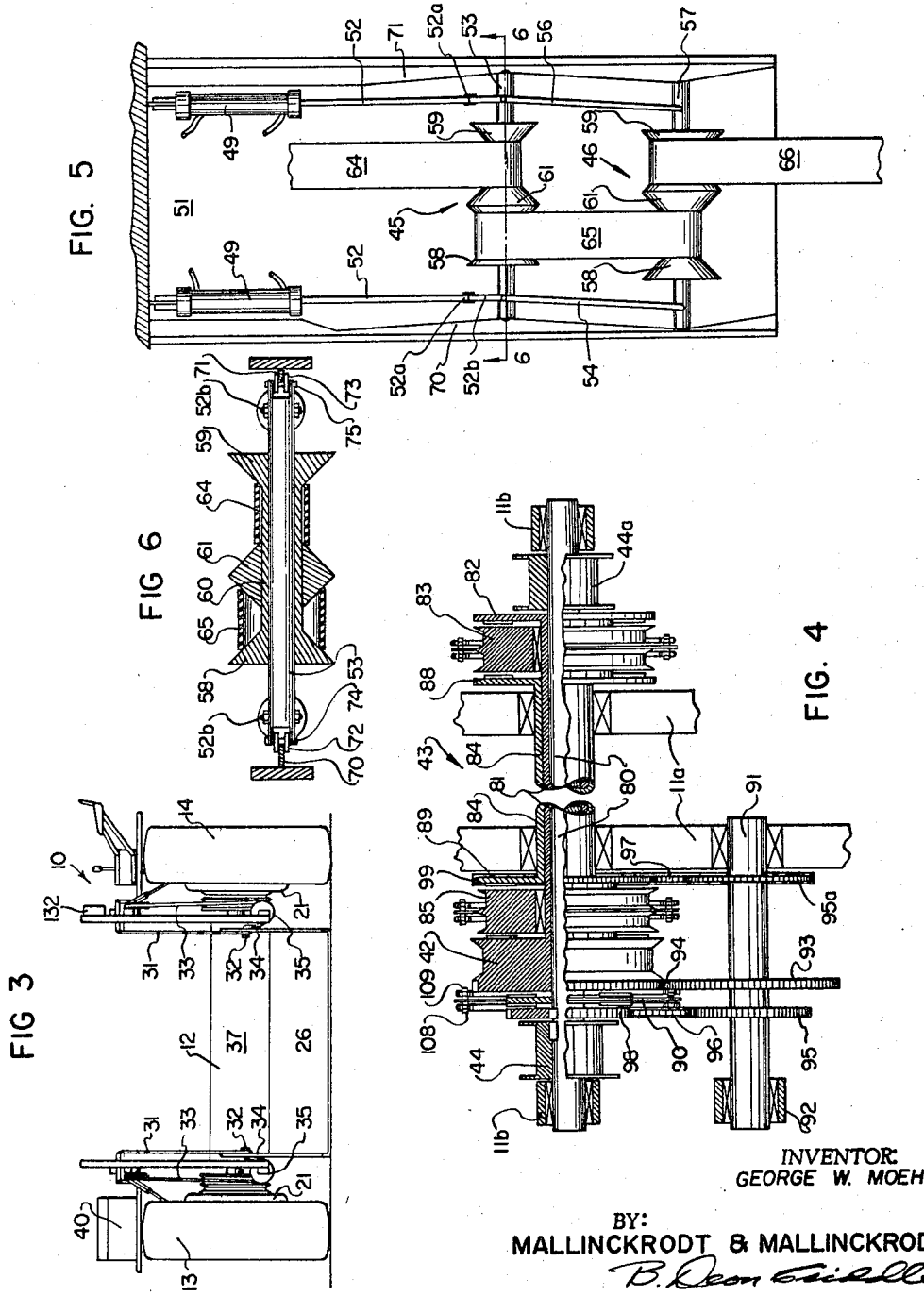

May 21, 1968 G. W. MOEHR 3,383,935
POWER SELECTOR
Original Filed Feb. 1, 1965
3 Sheets-Sheet 3
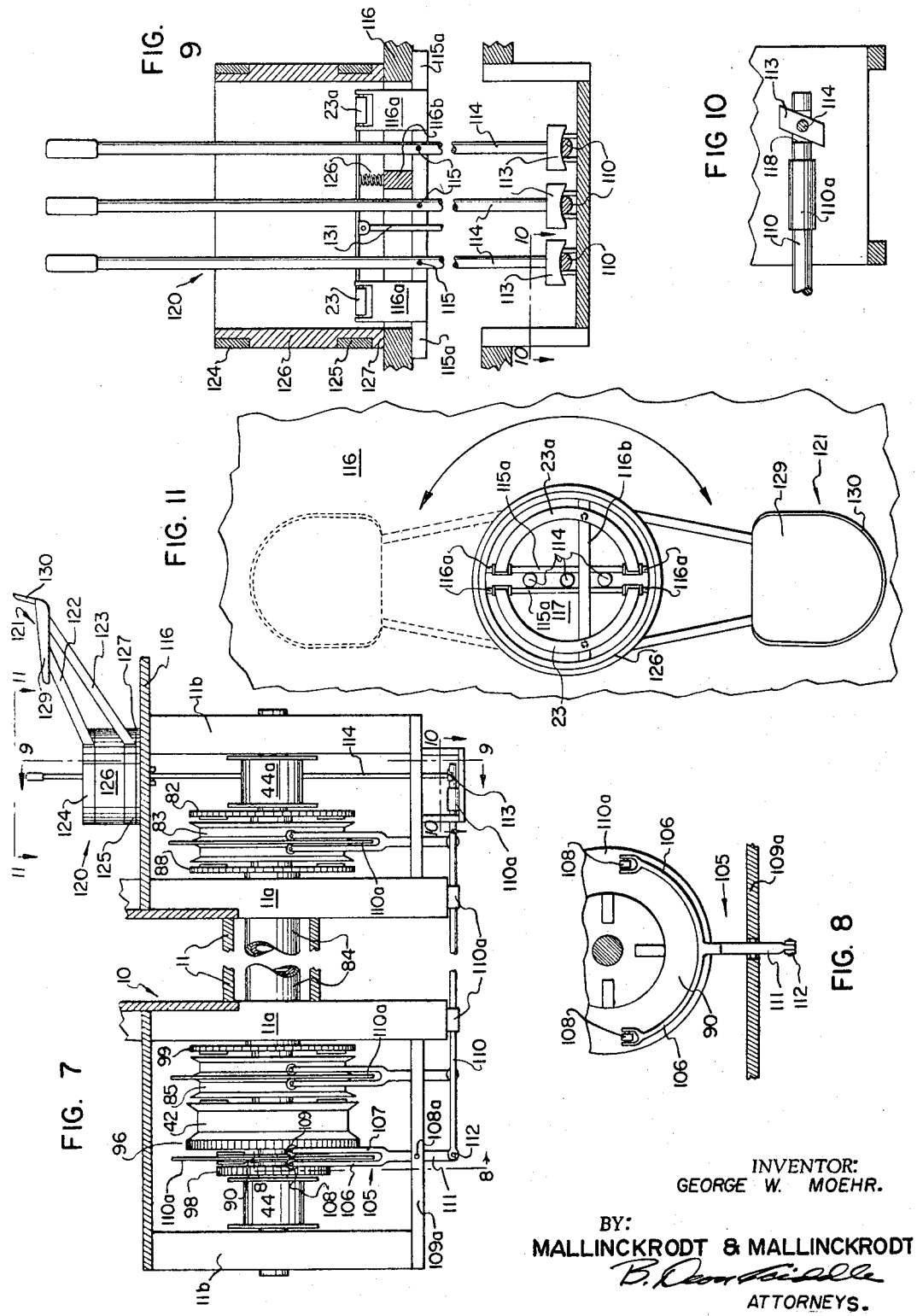
INVENTOR:
GEORGE W. MOEHR.
BY:
MALLINCKRODT & MALLINCKRODT
ATTORNEYS.

United States Patent Office 3,383,935
Patented May 21, 1968

3,383,935
POWER SELECTOR
George W. Moehr, P.O. Box 272, Big Piney, Wyo. 83113
Original application Feb. 1, 1965, Ser. No. 429,265, now Patent No. 3,306,478, dated Dec. 6, 1966. Divided and this application Aug. 15, 1966, Ser. No. 590,447
4 Claims. (Cl. 74—230.17)

ABSTRACT OF THE DISCLOSURE

A power selector wherein drive, ratio, and driven belts are maintained taut and centered around variable pulleys as the pulley diameters are changed. Tracks are provided at the ends of the pulleys to guide them into centering position and the pulley shafts are interconnected to maintain the distance between pulleys substantially constant.

*Brief description of the invention*

This invention relates to vehicles for scooping up ore within underground mines, transporting the ore to the exterior of the mine, and dumping it, either from a ramp into an awaiting ore car, or at an appropriate stockpile, and is a division of application Ser. No. 429,265, filed Feb. 1, 1965, now U.S. Patent No. 3,306,478.

Because of the confined area in which they are used, such vehicles must have a low profile and be extremely maneuverable. In addition, they must have a wide power range and be capable of self-loading a maximum ore load within the limited space of the mine, and of self-unloading after the vehicle has been moved out of the mine tunnel. This is especially true in small mines operated by one or two miners.

It is a principal object of the present invention to provide a vehicle that is self-loading, without increasing the over-all height of the vehicle during loading operations, thereby allowing the load box of the vehicle to be as large as the mine tunnel will permit. Other objects are to provide such a vehicle that is self-unloading, highly maneuverable, and provided with a wide power range, while still being rugged and economically constructed.

Principal features of the invention include a four-wheeled vehicle chassis supporting an open-ended load box; a scoop arranged to pick up material in front of the vehicle and to deposit it within the load box, as well as to push it off the open rear end of the load box; power selector and drive control means interconnecting a conventional power source and each wheel to thereby provide a positive drive for each wheel and also interconnecting the power source and the scoop; the power selector allowing selection of an infinite range of drive ratios for the vehicle wheel and the scoop, between extreme high and low ratios; and the drive control means serving to selectively connect and disconnect the set of wheels on each side of the chassis with power supplied through the power selector such that each set is powered in either a forward or reverse direction, or disconnected from the power source, and to selectively connect and disconnect the power source and the scoop.

There is shown in the accompanying drawing a specific embodiment of the invention representing what is presently regarded as the best mode of carrying out the generic concepts in actual practice. From the detailed description of this presently preferred form of the invention, other more specific objects and features will become apparent.

In the drawing:

FIG. 1 is a top plan view of the vehicle of the invention, with the operator's platform and controls, and the motor support and power unit positions shown in dotted line;

FIG. 2, a side elevation of the vehicle, including the motor support and power unit;

FIG. 3, a front elevation, showing the operator's platform and controls and the motor support and power unit;

FIG. 4, a horizontal section taken on line 4—4 of FIG. 2;

FIG. 5, a top plan view of the power selector taken on the line 5—5 of FIG. 2;

FIG. 6, a vertical section through the power selector, taken on the line 6—6 of FIG. 5;

FIG. 7, a vertical section taken on the line 7—7 of FIG. 2;

FIG. 8, a fragmentary vertical section view taken on the line 8—8 of FIG. 7;

FIG. 9, another vertical section taken on the line 9—9 of FIG. 7;

FIG. 10 is a sectional view taken on the line 10—10 of FIG. 7, showing the control rods; and FIG. 11, a top plan view of the operator's platform and controls, taken on the line 11—11 of FIG. 7.

Referring now to the drawings:

In the illustrated preferred embodiment the vehicle, shown generally at 10, consists of a chassis 11 carrying an open-ended load box 12. Wheels 13 and 14 are independently journaled on axle 15 at opposite sides of one end of chassis 11 and wheels 17 and 18 are similarly journaled on axle 19 at opposite sides of the chassis at its other end. Each wheel has the usual vehicle-type hydraulic brake assembly within a housing 21. This includes conventional brake drums, lining, and wheel cylinders, not shown, and these brakes are simultaneously actuated through brake pedals 23 and 23a (FIG. 11) and the usual linkage and master cylinder assemblies, not shown. Tubular members 24 are fixed, one at each side of the load box by welding or the like and corresponding tubular members 25 are held a spaced distance away from members 24 by brackets 27. Together the paired tubular members constitute guideways in which peripherally grooved rollers 28 roll. The guideways thus formed curve up from the front of the vehicle, extend along the top of the load box, continue to the rear thereof, and curve downwardly again before terminating at the ends of braces 29 and 30, fixed to the load box. Rollers 28 are rotatably mounted on the forward portion of each of the sides 20 of scoop 26 and pulling on cables 31 that are fixed to scoop 26 at ears 32 and that pass around end pulleys 32a will raise the scoop, tilt it, and then move it as far into the load box as desired. The same cables can be used to pull the scoop off the rear end of the load box, dragging with it the material previously dumped thereon. The material is pushed off the open rear end of the load box and, because of the downward curve of the guideways at the end, the scoop is tilted to dump any material accumulated therein.

Another pair of cables 33 are fixed to scoop 26 at flanges 34, on the outside of sides 30 of the scoop. These cables pass around pulleys 35 fixed to the bottom of the depending front section 36 of load box 12 such that continued pulling on them will roll the scoop on the guideways from its dumping position at the rear of the load box back to the loading position illustrated.

In the illustrated loading position, the vehicle can be driven forward to force material ahead of the vehicle onto the scoop. The scoop is prevented from yielding rearwardly during this operation by rollers 28 and by a backing member consisting of wall 37 of the depending front section. As described, scoop operation is dependent upon movement of cables 31 and 33 and as cables 31 are reeled in to pull the scoop up, onto and beyond the load box, cables 33 are unreeled. Similarly, when cables 33 are reeled in to pull the scoop back to the loading position cables 31 are simultaneously unreeled, all as will be described in further detail.

The drive assembly for the vehicle wheels and scoop includes a power source which may be the conventional water-cooled gasoline engine 40, illustrated, or other internal combustion or electric motor, the necessary reduction gearing, and a power selector 41. Power selector 41 transmits motion from engine 40 to a drive pulley 42 (FIGS. 4 and 7) of drive control means 43, through which one or both sets of wheels 13, 17 and 14, 18, or cable drums 44 and 44a (FIGS. 4 and 7) are selectively driven in either a forward or reverse direction.

The power ratio between the power source and drive pulley 42 is determined by the position of variable pulley sets 45 and 46 (FIGS. 5 and 6) and their position is set by the operator through regulation of control valve 47.

Control valve 47 can be solenoid actuated, or the mechanically actuated spool valve illustrated can be employed. Pressure liquid is supplied from pump 48 (FIG. 2) to the rear of pistons in hydraulic cylinders 49, while pressure liquid at the front, or piston rod sides, of the pistons is exhausted to reservoir 50, and vice versa.

Hydraulic cylinders 49 are fixed to a platform 51 and each has a piston rod 52 extending through the cylinder and hingedly connected at 52a to a rod 52b that is pivotally connected to a shaft 53 of pulley set 45. The pulley sets are maintained a spaced distance apart by pivotally connected rods 54 and 56 which interconnect shaft 53 and a similar shaft 57 of pulley set 46. Actuation of hydraulic cylinder 49 forces piston rod 52 into or out of the cylinder according to the setting of valve 47, and this moves the pulley sets along platform 51.

Each pulley set includes a pair of conical outer members 58 and 59 arranged on an interconnecting sleeve 60 (FIG. 6) such that their apexes are mutually facing. Sleeves 60 are freely rotatable about their respective shafts 53 and 57. Each pulley set also includes a center member 61 positioned between outer members 58 and 59 and having opposite faces corresponding to and matching the sloping faces of the conical outer members. Each center member 61 is both freely slidable along and rotatable about its sleeve 60.

The drive system for the vehicle is from engine 40, through reduction gearing in housing 62, pulley 63 driven by the reduction gearing, belt 64 interconnecting pulley 63 and the pulley formed between members 61 and 59 of pulley set 45, belt 65 interconnecting the pulley formed between members 61 and 58 of the pulley sets, and belt 66 interconnecting the pulley formed between members 61 and 59 of pulley set 46 and the drive pulley 42, which has a fixed position.

To change the power ratio of the vehicle it is only necessary to extend or retract piston rods 52, thus moving the pulley sets in unison. Movement of the pulley sets away from the cylinders tends to increase tension on belt 64 and causes member 61 of pulley set 45 to move toward its outer member 58. This, in turn, causes the radius of curvature of belt 65 about pulley set 45 to increase as the sloping surface of member 61 moves thereunder and tends to increase the tension on belt 65. The increased tension causes member 61 on pulley set 46 to move toward its member 59, sliding under belt 66 and increasing the curvature of the belt around pulley set 46 sufficiently to compensate for the slack that would normally develop in moving pulley set 46 nearer drive pulley 42. During retraction of piston rod 52 the tendency is for increased tension to develop in belt 66, with center members 61 moving in their reverse direction along the sleeve 60 to prevent slack developing in belt 64. As the position of the pulley sets is changed, the effective diameters of the pulleys formed on the pulley sets, about which the belts are passed, are changed, and a different input to output drive ratio is obtained. Since, with proper manipulation of control valve 47, the pulley sets can be maintained at any desired position, within maximum limits a substantially unlimited number of power ratios are available for selection by the vehicle operator.

In order to maintain drive belt alignment as the pulley sets are moved to vary their effective diameters, a pair of parallel guide tracks 70 and 71 are provided on platform 51. Flanged wheels 72 and 73 are journaled by pins 74 and 75 at opposite ends of each shaft 53 and 57 and roll on the tracks such that the pulley sets move within the parallel tracks.

In operation, as piston rods 52 are extended, and member 61 of pulley set 45 is moved toward its corresponding member 58 to reduce the effective diameter of the pulley formed between members 61 and 59, the belt 64 is moved laterally down the slope of member 59. At the same time belt 65 is moved laterally up the slope of member 58. The lateral movement of these belts, as well as the similar lateral movement of the belts at the other pulleys is compensated by an opposite lateral movement of the pulley sets as they follow the curved parallel guide tracks 70 and 71, to maintain belt alignment. As the piston rod is retracted, the pulley sets are moved in the opposite lateral direction to again maintain belt alignment.

The output drive belt 66 of power selector 41 drives pulley 42 (FIGS. 4 and 7), and manipulation of drive control means 43 places pulley 42 selectively in a neutral condition, or in driving engagement with the vehicle wheels and/or the scoop.

Drive control means 43 also includes a central shaft 80 (FIG. 4) journaled through depending side walls 11a of the load box and through support posts 11b fixed to the chassis. The cable drums 44 and 44a are fixed to opposite ends of shaft 80 outwardly of the vehicle. Drive pulley 42 is mounted at one side of the vehicle on a sleeve 81 that surrounds central shaft 80 and the other end of the sleeve forms a radial clutch plate 82, positioned between cable drum 44a and a double-grooved wheel-drive pulley 83 that is journaled about sleeve 81. Another sleeve 84 surrounds sleeve 81 and extends between the double-grooved wheel-drive pulley 83 and a similar double-grooved wheel-drive pulley 85 that is journaled around sleeve 81 at the opposite side of the vehicle. Radial clutch plates 88 and 89 extend outwardly from sleeve 84 adjacent wheel-drive pulleys 83 and 85, respectively. A clutch plate 90 is positioned between cable drum 44 and drive pulley 42, and is spline connected to shaft 80 such that the plate is slidable along shaft 80 and into selective engagement with drive pulley 42. Because of their interconnecting spline fit, clutch plate 90 will always rotate with shaft 80.

The reversing mechanism for the drive control means includes a reversing shaft 91 journaled through a side wall 11a of the load box and through post 92 fixed to the chassis. A reversing gear 93 is fixed to reversing shaft 91, in meshing engagement with a gear 94 formed integral with the main drive pulley 42. A pair of sprockets 95 and 95a are also fixed to reversing shaft 91, and chains 96, and 97, respectively, connect the sprockets with a sprocket 98 journaled for free rotation on shaft 80 between clutch plate 90 and cable drum 44, and with a sprocket 99 formed on clutch plate 88.

With the drive control means described, drive pulley 42, sleeve 81 and clutch plate 82 continuously rotate in one direction, i.e., a forward direction, the speed of rotation being dependent upon the speed of the power source and the setting of the power selector. If wheel drive pulley 83 is moved into frictional engagement with clutch plate 82 fixed to the main drive pulley, wheels 13 and 17 are driven in a forward direction through belts 100 and 101, that respectively interconnect the wheel drive pulley 83 and pulleys fixed to the wheel hubs.

Similarly, if wheel drive pulley 85 is moved into frictional engagement with wheel pulley 42, wheels 14 and 18 are driven in the same direction by means of belts 102 and 103 that interconnect wheel drive pulley 85 and pulleys fixed to the wheel hub.

By use of shifting linkage to be described, both sets of wheels 13, 17 and 14, 18 can be simultaneously driven in the forward direction, or the sets can be singly powered.

Movement of clutch plate 90 into frictional engagement with main drive pulley 42 result in forward rotation of the clutch plate and shaft 80 to which it is splined, as well as rotation of the cable drums 44 and 44a in the same direction, i.e. a direction taking up cables 33 and unreeling cables 31. Obviously, the cable drums can be driven at the same time one or both sets of wheels are driven, if so desired. To reverse the direction of rotation of the wheels, the wheel drive pulleys 83 and 85 are moved into frictional engagement with clutch plates 88 and 89, respectively. The meshing engagement of gears 94 and 93 results to rotation of shaft 91 including sprockets 95 and 95a in a direction opposite the rotation of the main drive pulley. Therefore, the clutch plates 88 and 89 driven by chain 97, drive the sets of wheels, either together, or singly, in a direction opposite the direction of rotation of the main drive pulley. In the same manner, movement of clutch plate 90 into frictional engagement with sprocket 98 driven by chain 96 will result in rotation of shaft 80 and cable drums 44 and 44a in a direction opposite the rotation of the main drive pulley 52, i.e. a reverse direction, wherein cables 31 are taken up and cables 33 are unreeled.

The wheel-drive pulleys 83 and 85 and clutch plate 90 are each shifted into their respective driving positions by a shift linkage that includes a yoke 105 having divided bifurcated ends 106 and 107. A pair of mutually facing roller wheels 108 and 109 (FIG. 4) are rotatably supported by each bifurcated end. The yokes are pivotally mounted at pins 108a to brackets 109a fixed to the vehicle chassis and are pivoted by longitudinal movement of pivot rods 110 that are connected to depending arms 111 by a clevis 112. Rods 110 are moved longitudinally within guides 110a by the wedging action of arcuately shaped wedges 113 fixed to the bottom of control levers 114, FIGS. 9–11. The control levers are pivotally mounted at 115 to braces 115a welded to the operator's platform 116 and extend downwardly through a hole 117 in the platform such that the wedges are diagonally positioned within grooves 118 in rods 110. Thus, as the control rods are pivoted, the arcuate surface of wedges 113 maintain contact with grooves 118, and as the wedges engage the groove sides they move the rods 110 in an axial direction. Control arms 111 are offset so that the rods 110 can be positioned in side-by-side relationship passing beneath the load bed of chassis 11. The roller wheels are positioned on opposite sides of flanges 110a rimming the moved members, i.e. the wheel-drive pulleys 83 and 85 and clutch plate 90 such that as the yokes are pivoted as a result of longitudinal movement of rods 110, the rollers acting on flanges 110a will force the moved member to the desired position. Any conventional means such as, for example, friction dent means (not shown) can be used to hold the control levers in their set positions, or, if desired, they can be held manually.

Surrounding hole 117 is a base 120 for an operator's chair shown generally at 121 in FIGS. 7 and 11. This chair includes a seat 129, mounted on supports 112 and 123 and a back 130 and is pivotable completely around the base 120 so the operator can position himself to easily guide the vehicle in any direction. If desired, matching stops, not shown, can be provided on rings 124 and 125 and base 120 to limit rotation of the chair to 180°.

Brake pedals 23 and 23a (FIGS. 9 and 11) are arcuately shaped to each extend approximately 180° around control levers 114 such that the operator has easy access to both pedals when his chair is facing either the front or the rear of the vehicle. The brake pedals are pivotally mounted at each of their ends to cross braces 116a fixed to braces 115a. The usual linkage, shown fragmentarily at 131, expands from the pedals to the usual brake control cylinders, not shown, and springs 126, positioned between the pedals and braces 116b connected to the operator's platform, normally bias the brake pedals to a released position.

To use the vehicle, the operator sits on chair 21 and swings it about its base until he faces in the desired direction of travel, or in the direction of loading or unloading operations. Steering of the vehicle is accomplished through use of the brakes and the drive control means. Thus, by applying the brakes to the wheels at one side of the vehicle and driving the opposite wheels, the vehicle can be pivoted about the braked wheels. Turns can be made even more abruptly if the wheels at opposite sides of the vehicle are driven in opposite directions. This is easily done by proper manipulation of the appropriate control levers of the drive control means. In the same manner, through proper manipulation of the appropriate control lever, the operator can easily control scoop operation to load or dump the load box.

The operator for the control valve of the power selector, and the accelerator, if one is employed, are readily positioned on a panel 132 mounted on the exterior of the load box where they are accessible from either operating position of the chair. Flexible cables in cable housings conveniently serve as the linkage between the operator and accelerator and the control valve for the power selector, and the throttle valve for the motor.

Jack hammers or other mining equipment can be readily carried by the vehicle and are easily powered by the vehicle motor, if desired.

Whereas there is here illustrated and specifically described a certain preferred construction of apparatus which is presently regarded as the best mode of carrying out the invention it should be understood that various changes may be made and other constructions adopted without departing from the inventive subject matter particularly pointed out and claimed herebelow.

I claim:

1. A power selector, comprising a platform; guide means mounted on said platform; a pair of shafts; wheel means at each end of each of said shafts, said wheel means being riding on said guide means, to thereby shift the shafts in their longitudinal direction; a pair of pulley means on each of said shafts; endless belt means interconnecting one of the pulley means on one of said shafts with an opposing pulley means on the other of said shafts; endless belt means to interconnect the other pulley means on said one shaft with a power input source; endless belt means adapted to interconnect the other pulley means of the other of said shafts and a driven member; and means to simultaneously change the distance between the one shaft and the power input source and the distance between the shaft and the driven member while maintaining a constant tension on each of said endless belts.

2. A power selector according to claim 1, wherein each of said pulley means includes a fixed conical member and a movable conical member, the apexes of said conical members facing each other.

3. A power selector according to claim 2, wherein the movable conical members of the pulley means on each shaft are integral.

4. A power selector according to claim 1, wherein the guide means mounted on the platform comprise tracks arranged to shift the shafts laterally a sufficient distance and in the direction necessary to compensate for movement of the belts with respect to the pulley means, thereby maintaining constant belt alignment.

References Cited

UNITED STATES PATENTS

| | | | |
|---|---|---|---|
| 1,235,794 | 8/1917 | Hardaker | 74—230.17 |
| 2,208,430 | 7/1940 | Ostler | 74—230.17 |
| 3,128,033 | 6/1964 | Glasson et al. | 74—230.17 |
| 3,140,620 | 7/1964 | Ferara | 74—229 |

FRED C. MATTERN, JR., *Primary Examiner.*

C. J. HUSAR, *Assistant Examiner.*